(12) United States Patent
Ouanounou et al.

(10) Patent No.: US 11,997,197 B1
(45) Date of Patent: May 28, 2024

(54) PUSH ARCHITECTURE FOR SECURE PROVISION OF SECRETS

(71) Applicant: CyberArk Software Ltd., Petach-Tikva (IL)

(72) Inventors: Emmanuel Ouanounou, Petach-Tikva (IL); Asaf Hecht, Petach-Tikva (IL)

(73) Assignee: CyberArk Software Ltd., Petach-Tikva (IL)

( * ) Notice: Subject to any disclaimer, the term of this patent is extended or adjusted under 35 U.S.C. 154(b) by 0 days.

(21) Appl. No.: 18/216,274

(22) Filed: Jun. 29, 2023

(51) Int. Cl.
*G06F 21/00* (2013.01)
*H04L 9/08* (2006.01)

(52) U.S. Cl.
CPC .................................. *H04L 9/085* (2013.01)

(58) Field of Classification Search
None
See application file for complete search history.

(56) References Cited

U.S. PATENT DOCUMENTS

| | | | | |
|---|---|---|---|---|
| 7,907,935 B2* | 3/2011 | Le Saint | ................. | G06F 21/31 455/411 |
| 9,032,498 B1* | 5/2015 | Ben Ayed | ............... | G06F 21/35 726/9 |
| 9,946,789 B1* | 4/2018 | Li | ........................... | G06F 16/93 |
| 10,873,452 B1* | 12/2020 | Zhou | ....................... | H04L 9/085 |
| 11,032,270 B1* | 6/2021 | Tsarfati | ............... | H04L 63/0281 |
| 11,106,789 B2* | 8/2021 | Kraus | ................. | H04L 63/1416 |
| 2012/0011360 A1* | 1/2012 | Engels | .................... | H04L 9/006 380/278 |
| 2012/0330859 A1* | 12/2012 | Ren | ...................... | G06Q 10/067 705/348 |
| 2013/0145172 A1* | 6/2013 | Shablygin | ............... | G06F 21/33 713/185 |
| 2019/0172045 A1* | 6/2019 | Dunjic | ............... | G06Q 20/3224 |

* cited by examiner

*Primary Examiner* — Maung T Lwin
(74) *Attorney, Agent, or Firm* — FINNEGAN, HENDERSON, FARABOW, GARRETT & DUNNER, LLP

(57) ABSTRACT

Disclosed embodiments relate to systems and methods for securely providing secrets. Techniques include receiving, from an entity, trigger information indicative of an action to be performed by at least one service based on the trigger information; identifying at least one secret expected to be used by the at least one service to perform the action, the at least one secret being identified based on information correlating the trigger information to the at least one secret; and causing the at least one secret to be provided to the at least one service, wherein the at least one secret is provided to the at least one service independent of any request for the at least one secret.

30 Claims, 7 Drawing Sheets

PUSH ARCHITECTURE FOR SECURE PROVISION OF SECRETS

BACKGROUND

Technical Field

The present disclosure relates generally to cybersecurity and, more specifically, to techniques for secure provision of secrets for performing a privileged computer operation.

Background Information

In modern network-based environments, it is increasingly important for organizations and individuals alike to securely control which processes are authorized to perform sensitive operations and when. Many software architectures include one or more dedicated services for provisioning secrets to applications or services thereof. For example, secrets used by services to authenticate with each other may be stored in specific secured locations. A secret provider may receive a request for a secret from a service and, in response, may provide the secret according to one or more rules. In other words, when a service needs a secret, it asks for it from the secrets providing service.

Under this arrangement, the secrets provider may manage and control which services can perform which operations, thus providing general security benefits for the system. However, this arrangement presents several significant technological security flaws. For example, if an attacker takes over the service, the attacker can retrieve the secrets simply by requesting the secrets from the secrets provider. Accordingly, an attacker that takes over the service can perform any action the service is allowed to perform. This architecture also presents a "secret zero" problem, in which the service needs to initially authenticate itself to the secrets provider. Further, the service must wait for a response from the secrets provider to perform each action requiring a secret, which takes time and thus may negatively affect the level of performance of the action.

Some existing techniques attempt to address these technological and security problems through delegating secrets retrieval to a sidecar container. In such systems, the secret is never received by the service itself, but rather another container is responsible for retrieving the secret on behalf of the service and forwarding the request along with the secret to another service. This may reduce the risks associated with an attacker taking over the service, as the attacker must also take control of the sidecar container. However, technological and security flaws remain. Indeed, this technique reduces efficiency even further as a separate step or layer is added for retrieving the secret. In addition, from a security standpoint, the attack surface is not minimized.

Accordingly, in view of these and other deficiencies in existing techniques, technological solutions are needed for reliably and securely providing secrets. In particular, solutions should advantageously anticipate which secrets may be required by a service and provide them in advance, without relying on a request from the service, thereby improving both the security and efficiency of the process. These and other techniques are discussed below, providing significant technological improvements in the areas of security, efficiency, and usability.

SUMMARY

The disclosed embodiments describe non-transitory computer readable media, systems, and methods for securely providing secrets. For example, in an embodiment, a non-transitory computer readable medium may include instructions that, when executed by at least one processor, cause the at least one processor to perform operations for securely providing secrets. The operations may comprise receiving, from an entity, trigger information indicative of an action to be performed by at least one service based on the trigger information; identifying at least one secret expected to be used by the at least one service to perform the action, the at least one secret being identified based on information correlating the trigger information to the at least one secret; and causing the at least one secret to be provided to the at least one service, wherein the at least one secret is provided to the at least one service independent of any request for the at least one secret.

According to a disclosed embodiment, identifying the at least one secret may include at least one of: applying a trained model, emulating at least one aspect of an application associated with the at least one service based on the trigger information, or applying at least one rule of a plurality of rules.

According to a disclosed embodiment, the trained model may be a machine learning model.

According to a disclosed embodiment, the trigger information may be associated with at least one parameter to be used to perform the action, and the at least one secret is identified using the at least one parameter.

According to a disclosed embodiment, identifying the at least one secret expected to be used by the at least one service to perform the action may include predicting, based on the trigger information, the action to be performed by at least one service.

According to a disclosed embodiment, the information correlating the trigger information to the at least one secret may include information correlating the action to the at least one secret.

According to a disclosed embodiment, the information correlating the trigger information to the at least one secret may include information correlating the trigger information to the action.

According to a disclosed embodiment, causing the at least one secret to be provided to the at least one service may include: at least one of generating or retrieving the at least one secret; and transmitting the at least one secret to the at least one service.

According to a disclosed embodiment, causing the at least one secret to be provided to the at least one service may include generating instructions for the at least one secret to be provided to the at least one service.

According to a disclosed embodiment, the operations may further comprise: identifying at least one additional service associated with the action; identifying at least one additional secret expected to be used by the at least one additional service; and causing the at least one additional secret to be provided to the at least one additional service, wherein the at least one additional secret is provided to the at least one additional service independent of a request for the at least one additional secret.

According to a disclosed embodiment, the operations may further comprise: receiving, from the at least one service, an indication that at least one alternate secret is required; and causing the at least one alternate secret to be provided to the at least one service.

According to a disclosed embodiment, the operations may further comprise updating the information correlating the trigger information to the at least one secret to reflect a correlation between the trigger information and the at least one alternate secret.

According to a disclosed embodiment, the operations may further comprise: foregoing causing the at least one secret to be provided to the at least one service based on a determination that the at least one secret expected to be used cannot be identified; receiving, from the at least one service, an indication that at least one alternate secret is required; and causing the at least one alternate secret to be provided to the at least one service based on the indication.

According to a disclosed embodiment, the determination the at least one secret expected to be used may not be identified is based on a level of confidence.

According to a disclosed embodiment, the operations may further comprise updating the information correlating the trigger information to the at least one secret based on the indication.

According to a disclosed embodiment, the operations may further comprise: monitoring the at least one service to determine a requirement for the at least one secret has not been satisfied; and causing at least one of the at least one secret or at least one alternate secret to be provided to the at least one service based on the monitoring.

According to a disclosed embodiment, the at least one secret may not be used by the at least one service to perform at least one additional action not associated with the trigger information.

According to a disclosed embodiment, the entity may be external to the at least one service.

According to a disclosed embodiment, the entity may be a process executing as part of the at least one service.

According to a disclosed embodiment, the at least one service may be configured to initiate performing the action prior to receiving the at least one secret.

According to another disclosed embodiment, there may be a computer-implemented method for securely providing secrets. The method may comprise receiving, from an entity, trigger information indicative of an action to be performed by at least one service based on the trigger information; identifying at least one secret expected to be used by the at least one service to perform the action, the at least one secret being identified based on information correlating the trigger information to the at least one secret; and causing the at least one secret to be provided to the at least one service, wherein the at least one secret is provided to the at least one service independent of any request for the at least one secret.

According to a disclosed embodiment, the method may further comprise generating the information correlating the trigger information to the at least one secret.

According to a disclosed embodiment, generating the information correlating the trigger information to the at least one secret may include: receiving, from the entity, initial trigger information indicative of the action to be performed by at least one service; identifying, a request from the at least one service for the at least one secret; determining a correlation between the initial trigger information and the at least one secret; and generating the information correlating the trigger information to the at least one secret based on the determined correlation.

According to a disclosed embodiment, generating the information correlating the trigger information to the at least one secret may include storing the determined correlation.

According to a disclosed embodiment, the initial trigger information and the trigger information may share at least one common parameter.

According to a disclosed embodiment, the initial trigger information and the trigger information may not share a common parameter.

According to a disclosed embodiment, generating the information correlating the trigger information to the at least one secret may include: accessing data for emulating actions performed by the at least one service; initiating an emulation of the at least one service based on the trigger information; determining the at least one secret is used based on the emulation; and generating the information correlating the trigger information to the at least one secret based on the determination.

According to a disclosed embodiment, generating the information correlating the trigger information to the at least one secret may further include: accessing at least a portion of code used by the at least one service; and generating the data for emulating actions performed by the at least one service based on the at least a portion of code.

According to a disclosed embodiment, the information correlating the trigger information to the at least one secret may include at least one rule of a plurality of rules, the at least one rule associating the trigger information with the at least one secret.

Aspects of the disclosed embodiments may include tangible computer-readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Figure 1:
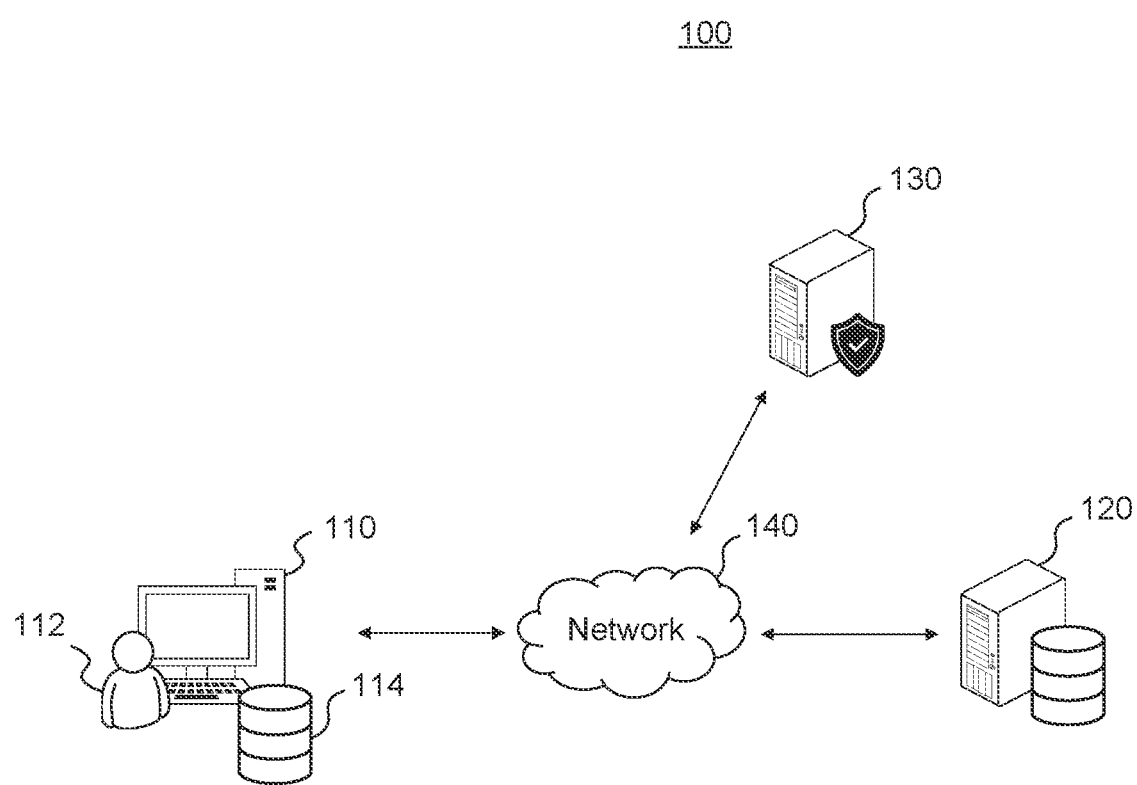
FIG. 1 illustrates an example system environment for securely performing privileged computing actions, consistent with the disclosed embodiments.

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

The techniques for securely providing secrets described herein overcome several technological problems relating to security, efficiency, and performance in the fields of cybersecurity and network security. As discussed above, through taking control of one or more services within an application, attackers may gain access to perform any actions the service is allowed to perform by requesting secrets from a secrets provider. To address this, rather than provision secrets based on requests, the disclosed techniques may predict which secrets will be required or useful for individual services, or groups of services, and provide them on an as-needed basis. In particular, a secrets provider may receive (or otherwise access) trigger information provided to or made available to one or more services. This trigger information may represent a "starting point," which ultimately causes an application, or at least one service associated with the application (either the same one receiving the trigger information, or a subsequent service) to perform an action, including an action requiring a secret. Because the secrets provider also has access to the trigger information, it can predict which services will require which secrets, and when. Accordingly, the secrets provider may provide the secret proactively, without (or independent of) any requests from the services requiring the secrets.

The disclosed techniques thus provide significant improvements over the various existing techniques described above. For example, the disclosed techniques may reduce the ability for an attacker to retrieve a secret in the environment of an application because the attacker would only receive secrets in response to the proper trigger information being received at the service provider. Accordingly, the attacker would still not be able to perform many activities that the service is technically allowed to perform in certain contexts. Rather, the secret provider can provide very specific context-based permissions based on the particular trigger information. This also solves the "secret zero" problem described above, as the application would no longer need to authenticate to the secrets provider. Further, the disclosed techniques may greatly improve the efficiency of the system as less time is required between an application's need for secret and when the secret is provided.

Reference will now be made in detail to the disclosed embodiments, examples of which are illustrated in the accompanying drawings.

FIG. 1 illustrates an example system environment 100 for performing privileged computing actions, consistent with the disclosed embodiments. System environment 100 may include one or more computing devices 110, one or more target resources 120, and one or more security servers 130, as shown in FIG. 1. System environment 100 may represent a system or network environment in which various privileged computing operations may be performed. As used herein, a privileged computing operation may refer to any operation requiring the entity performing the operation to have or be associated with at least one security privilege to perform the operation. For example, computing device 110 (or an entity associated with computing device 110, such as identity 112) may request to perform a privileged computing operation within system environment 100. In some embodiments, computing device 110 may include one or more services configured to perform some or all of a privileged computing operation, as described further below.

In some embodiments, a privileged computing operation may include a network-based privileged computing operation. For example, this may include an operation involving a file or other data on target resource 120, or privilege management server 130. Alternatively or additionally, this may include a local privileged computing operation. For example, the local computing operation may be an operation involving a file stored in computing device 110 or database 114. Accordingly, while system environment 100 is shown in FIG. 1 to include target resource 120 and security server 130 separately from computing device 110 by way of example, in some embodiments, one or both of target resource 120 and security server 130 may be integrated with computing device 110. For example, target resource 120 may be a local resource of computing device 110 and security server 130 may be an agent or other process running on computing device 110. Accordingly, system 100 may not necessarily be a network-based system environment and may be a local environment of computing device 110.

The various components of system environment 100 may communicate over a network 140. Such communications may take place across various types of networks, such as the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, a nearfield communications technique (e.g., Bluetooth, infrared, etc.), or various other types of network communications. In some embodiments, the communications may take place across two or more of these forms of networks and protocols. While system environment 100 is shown as a network-based environment, it is understood that in some embodiments, one or more aspects of the disclosed systems and methods may also be used in a localized system, with one or more of the components communicating directly with each other.

As noted above, system environment 100 may include one or more computing devices 110. Computing device 110 may include any device that may be used for performing a privileged computing operation. Accordingly, computing device 110 may include various forms of computer-based devices, such as a workstation or personal computer (e.g., a desktop or laptop computer), a mobile device (e.g., a mobile phone or tablet), a wearable device (e.g., a smart watch, smart jewelry, implantable device, fitness tracker, smart clothing, head-mounted display, etc.), an IoT device (e.g., smart home devices, industrial devices, etc.), or any other device that may be capable of performing a privileged computing operation. In some embodiments, computing device 110 may be a virtual machine (e.g., based on AWS™, Azure™, IBM Cloud™ etc.), container instance (e.g., Docker™ container, Java™ container, Windows Server™ container, etc.), or other virtualized instance.

In some embodiments, computing device 110 may be associated with an identity 112. Identity 112 may be any entity that may be associated with one or more privileges to be asserted to perform a privileged computing operation. For example, identity 112 may be a user, an account, an application, a process, an operating system, a service, an electronic signature, or any other entity or attribute associated with one or more components of system environment 100. In some embodiments, identity 112 may be a user requesting to perform a privileged computing operation through computing device 110. As noted above, this may be a privileged computing operation associated with data on computing device 110, target resource 120, and/or privilege management server 130.

Target resource 120 may include any form of computing device that may be the target of a privileged computing operation or privileged computing operation request. Examples of network resource 120 may include SQL servers, databases or data structures holding confidential information, restricted-use applications, operating system directory services, access-restricted cloud-computing resources (e.g., an AWS™ or Azure™ server), sensitive IoT equipment (e.g., physical access control devices, video surveillance equipment, etc.) and/or any other computer-based equipment or software that may be accessible over a network. Target resource 120 may include various other forms of computing devices, such as a mobile device (e.g., a mobile phone or tablet), a wearable device (a smart watch, smart jewelry, implantable device, fitness tracker, smart clothing, or head-mounted display, etc.), an IoT device (e.g., a network-connected appliance, vehicle, lighting, thermostat, room access controller, building entry controller, parking garage controller, sensor device, etc.), a gateway, switch, router, portable device, virtual machine, or any other device that may be subject to privileged computing operations. In some embodiments, target resource 120 may be a privileged resource, such that access to the network resource 120 may be limited or restricted. For example, access to the target resource 120 may require a secret (e.g., a password, a username, an SSH key, an asymmetric key, a symmetric key, a security or access token, a hash value, biometric data, personal data, etc.). In some embodiments target resource 120 may not necessarily be a separate device from computing device 110 and may be a local resource. Accordingly, target resource 120 may be a local hard drive, database, data structure, or other resource integrated with computing device 110.

Privilege management server 130 may be configured to monitor and/or manage one or more privileges within system environment 100. For example, privilege management server 130 may manage one or more privileges associated with identity 112 (or computing device 110) required to perform computing operations within system environment 100. In some embodiments, privilege management server 130 may represent a privileged access management (PAM) system or other access management system implemented within system environment 100. Alternatively or additionally, privilege management server 130 may be a security information and event management (SIEM) resource implemented within system environment 100. Privilege management server 130 may be configured to grant, track, monitor, store, revoke, validate, or otherwise manage privileges of various identities within system environment 100. While illustrated as a separate component of system environment 100, it is to be understood that privilege management server 130 may be integrated with one or more other components of system environment 100. For example, in some embodiments, privilege management server 130 may be implemented as part of target network resource 120, computing device 110, or another device of system environment 100.

In some embodiments, privilege management server 130 may be configured to predict a need for a secret (e.g., a privileged credential) and provide them proactively, as described in further detail below. For example, privilege management server 130 may identify trigger information within system 100 indicating computing device 110 (or one or more services executing on or in association with computing device (or devices) 110) may begin performing an action or series of actions requiring or involving a secret. Accordingly, privilege management server 130 may anticipate the need for the secret and provide it proactively. As described above, this may improve security and efficiency within system 100.

Figure 2A:
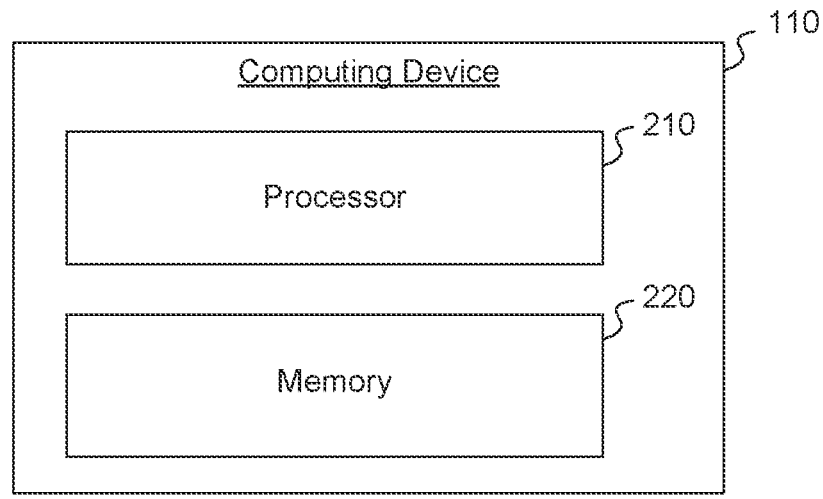
FIG. 2A is a block diagram showing an example computing device, consistent with the disclosed embodiments.

FIG. 2A is a block diagram showing an example computing device 110, consistent with the disclosed embodiments. Computing device 110 may include one or more dedicated processors and/or memories. For example, server 130 may include a processor (or multiple processors) 210, and a memory (or multiple memories) 220, as shown in FIG. 2A.

Processor 210 may take the form of, but is not limited to, a microprocessor, embedded processor, or the like, or may be integrated in a system on a chip (SoC). Furthermore, according to some embodiments, processor 210 may be from the family of processors manufactured by Intel®, AMD®, Qualcomm®, Apple®, NVIDIA®, or the like. The processor 210 may also be based on the ARM architecture, a mobile processor, or a graphics processing unit, etc. The disclosed embodiments are not limited to any type of processor configured in server 130.

Memory 220 may include one or more storage devices configured to store instructions used by the processor 210 to perform functions related to computing device 110. The disclosed embodiments are not limited to particular software programs or devices configured to perform dedicated tasks. For example, memory 220 may store a single program, such as a user-level application, that performs the functions associated with the disclosed embodiments, or may comprise multiple software programs. Additionally, processor 210 may, in some embodiments, execute one or more programs (or portions thereof) remotely located from computing device 110. Furthermore, memory 220 may include one or more storage devices configured to store data for use by the programs. Memory 220 may include, but is not limited to a hard drive, a solid state drive, a CD-ROM drive, a peripheral storage device (e.g., an external hard drive, a USB drive, etc.), a network drive, a cloud storage device, or any other storage device.

Figure 2B:
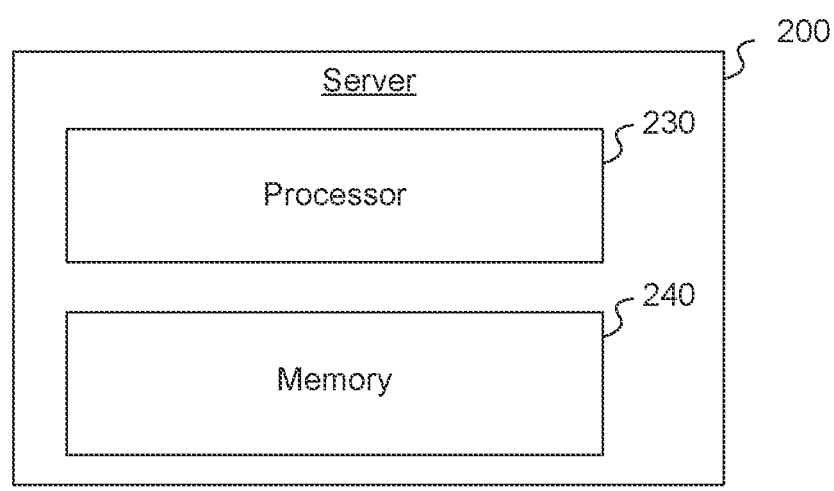
FIG. 2B is a block diagram showing an example server, consistent with the disclosed embodiments.

FIG. 2B is a block diagram showing an example server, consistent with the disclosed embodiments. For example, the server shown in FIG. 2B may correspond to one or both of privilege management server 130 and target resource 120. As shown in FIG. 2B, privilege management server 200 (e.g., similar to server 130) may include a processor (or multiple processors) 230, a memory (or multiple memories) 240, and/or one or more input/output (I/O) devices (not shown), as shown in FIG. 2B.

As with processor 210, processor 230 may take the form of, but is not limited to, a microprocessor, embedded processor, or the like, or may be integrated in a system on a chip (SoC). Furthermore, according to some embodiments, processor 230 may be from the family of processors manufactured by Intel®, AMD®, Qualcomm®, Apple®, NVIDIA®, or the like. Processor 230 may also be based on the ARM architecture, a mobile processor, or a graphics processing unit, etc. The disclosed embodiments are not limited to any type of processor configured in privilege management server 130/200.

Further, similar to memory 220, memory 240 may include one or more storage devices configured to store instructions used by the processor 230 to perform functions related to privilege management server 130/200. The disclosed embodiments are not limited to particular software programs or devices configured to perform dedicated tasks. For example, memory 240 may store a single program, such as a user-level application (e.g., a browser), that performs the functions associated with the disclosed embodiments, or may comprise multiple software programs. Additionally, processor 230 may, in some embodiments, execute one or more programs (or portions thereof) remotely located from privilege management server 130 (e.g., located on server 130/200). Furthermore, memory 240 may include one or more storage devices configured to store data for use by the programs. Memory 240 may include, but is not limited to a hard drive, a solid state drive, a CD-ROM drive, a peripheral storage device (e.g., an external hard drive, a USB drive, etc.), a network drive, a cloud storage device, or any other storage device.

Figure 3:
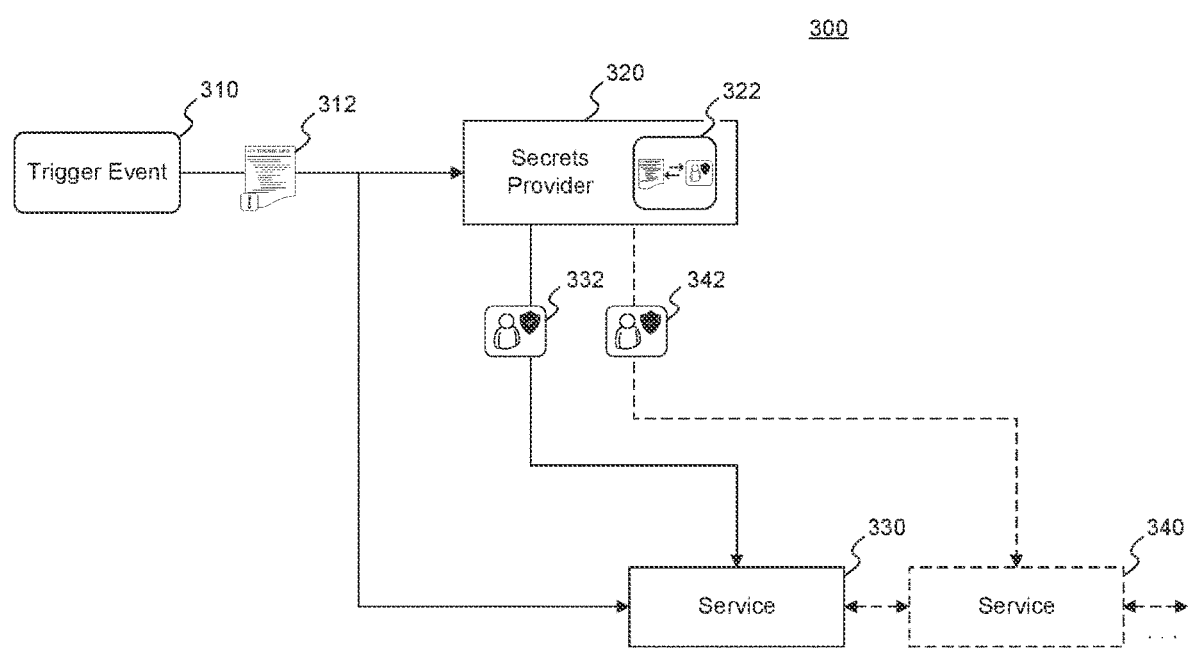
FIG. 3 is a block diagram showing an example process for securely providing secrets, consistent with the disclosed embodiments.

FIG. 3 is a block diagram showing an example process 300 for securely providing secrets, consistent with the disclosed embodiments. As shown in FIG. 3, process 300 may include a service 330, which may be configured to perform at least one privileged computing operation. Service 330 may be any form of code or software that performs a task, consistent with above embodiments. In some embodiments, service 330 may be an application running on a computing device, such as computing device 110. Alternatively or additionally, service 330 may be a portion of an application. For example, service 330 may be a part of the application available for calls by the application to provide certain functionality as part of the general execution functionality of the application. In some embodiments, the application may include a variety of different services. Accordingly, service 330 may cooperate with one or more other services (e.g., service 340) to perform one or more actions.

As indicated above, at least one action performed by service 330 may require or involve a secret. For example, service 330 may perform at least one action requiring or involving secret 332. As shown in FIG. 3, secret 332 may be provided to service 330 by a secrets provider 320. As used herein, a secrets provider may be any entity or service that is configured to provide secrets within system 100. For example, secrets provider 320 may include a Kubernetes secrets provider, an Envoy Secret Discovery Service (SDS), or any other form of service configured to provide secrets. In some embodiments, secrets provider 320 may correspond to or be associated with privilege management server 130 described above.

At least one action performed by service 330 may require secret 332. For example, service 330 may perform an action (e.g., a read or write action) requiring access to target resource 120, which may require a credential or other form of secret. While target resource 120 is illustrated as a network resource in FIG. 1, it is to be understood that service 330 may perform privileged actions on various other resources, including local resources within the same device, memory, or application. Other example actions that may require a secret include, invoking or initiating another service or application, installing an application, changing kernel functions, or any other form of action that may be restricted.

Using conventional techniques, service 330 may determine that a secret is required and request the secret from secrets provider 320, either directly or through a sidecar container, as described above. However, as indicated in FIG. 3, secrets provider 320 may provide secret 332 to service 330 without receiving a request. Secrets provider 320 may thus predict that secret 332 may be required and may provide secret 332 proactively, without a request from service 330.

In order to predict the need for secret 332, secrets provider 320 may receive or access trigger information 312, which may at least partially trigger service 330 to perform the action. Trigger information 312 may be provided to service 330 based on a trigger event 310, as shown in FIG. 3. Trigger event 310 may be any form of event that causes service 330 to perform one or more actions. In some embodiments, trigger event 310 may be an event external to service 330 (or an application associated with service 330), such as a query or request. For example, trigger event 310 may include an HTTP request received through network 140. Alternatively or additionally, trigger event 310 may be an event internal to service 330 or an application associated with service 330. In some embodiments, trigger event 310 may be a time-driven trigger. A time-driven trigger, also referred as a cloak-trigger, may allow instances (e.g., application code elements) to execute at a predefined time (e.g., a particular time, on a recurring interval, etc.). Time-driven triggers may include an operating system command such as "cron job" in Linux™. In some embodiments, trigger event 310 may be an event-driven trigger. An event-driven trigger may allow instances to execute when a certain condition is satisfied. For example, an event-driven trigger may include a call to a function associated with an application (such as an AWS Lambda function), or other software element that may cause an action to be performed. In some embodiments, trigger information 312 may be a packet, a call (such as an API call), a query, or other form of information indicating actions to be performed by an application.

At least a portion of trigger information 312 may be received by service 330 to trigger one or more actions of service 330. For example, in embodiments where trigger event 310 is an HTTP request, trigger information 312 may include various information included with the request, such as HTTP headers, the message body, or other information included in an HTTP request. In some embodiments, trigger information 312 may include metadata associated with the request, including any information about the context in which the request originated (e.g., time stamps, sequential order originating, a target resource, or the like). As another example, trigger information 312 may be a serverless function call and may include a serverless function name and/or parameters. As yet another example, trigger information 312 may be a cron job command used to trigger an action by service 330. One skilled in the art would recognize that trigger information 312 may include various other information used to trigger service 330, and the disclosed embodiments are not limited to the various examples provided herein.

As shown in FIG. 3, secrets provider 320 may also receive or access trigger information 312. In some embodiments, system 100 may be configured such that trigger information 312 is provided to both service 330 and secrets provider 320. Accordingly, secrets provider 320 may automatically receive trigger information 312. Alternatively or additionally, secrets provider 320 may monitor system 100 to identify trigger information 312. For example, this may include scanning or monitoring one or more of computing device 110, service 330, or network 140.

To predict the need for secret 332, secrets provider 320 may access correlation information 322, which may correlate trigger information 312 to secret 332. For example, secrets provider 320 may compare trigger information 312 to correlation information 322 to determine an expected need or use for secret 332. Correlation information 322 may be represented in a variety of formats. For example, correlation information 322 may be a data structure, such as a table, an array, a list (e.g., a linked list), a record, a stack, a tree, or any other format for storing a collection of data values and one or more relationships among the data values. In some embodiments, correlation information 322 may include information correlating trigger information 312 to secret 332 directly. Alternatively or additionally, this may include various intermediate correlations. For example, correlation information 322 may include information correlating trigger information 312 to at least one action expected to be performed based on trigger information 312, and secrets provider 320 may determine secret 332 based on the expected action. As another example, secrets provider 320 may identify the action based on trigger information 312 and correlation information 322 may include information correlating the action to secret 332.

In some embodiments, correlation information 322 may include information correlating various parameters to secret 332. For example, trigger information 312 may include various parameters, which may be included in an HTTP request (for example, the header or the body), a serverless function name and parameters, specific commands (such as a Linux cron job command), or other portions of trigger information 312, as described above. These parameters may provide details to service 330 regarding which actions to perform or how they should be performed. In some embodiments, these individual parameters (and/or combinations thereof) may be used to predict a need for secret 332. For example, correlation information 322 may include information correlating parameters or combinations of parameters to one or more secrets. In some embodiments, the trigger information may not necessarily include the parameter, but may be associated with the parameter.

In some embodiments, secrets provider 320 may determine a confidence level indicating a degree of confidence associated with an expected secret. For example, the confidence level may include a score indicating a degree of certainty that a secret will be required by service 330. The score may be represented as a value within a range (e.g., 0-10), as a percentage (e.g., 98%, 0.78, etc.), according to predetermined categories (e.g., high confidence, low confidence, etc.), or the like. In some embodiments, secrets provider 320 may identify multiple secrets that may be required and may select a secret based on the confidence level. For example, this may include selecting secret 332 based on secret 332 being associated with a higher confidence level than a confidence level associated with another secret.

After identifying secret 332 as being expected to be used by service 330, secrets provider 320 may cause secret 332 to be provided to service 330. In some embodiments, this may include transmitting secret 332 to service 330, as indicated in FIG. 3. In some embodiments, secret 332 may be an existing secret and may be retrieved by secrets provider 320. For example, secrets provider 320 may access a vault or other storage location containing secret 332 and retrieve secret 332. Alternatively or additionally, secrets provider 320 may be configured to generate secret 332. For example, secret 332 may be an ephemeral secret that is valid only for a predetermined period of time. While a single secret 332 is shown in FIG. 3, it is to be understood that secrets provider 320 may provide multiple secrets to service 330, which may be provided at the same time, or at different times.

In some embodiments, secret 332 may be specific to a certain action. In other words, rather than a generalized secret that may be potentially used by an attacker for performing other actions, secret 332 may be valid only for the action (or class of actions) expected to be performed by service 330 in association with trigger information 312. Accordingly, secret 332 may be provided according to a "least privilege" principle, in which only a minimum level (e.g., scope and/or duration) of privilege is provided to service 330 at the last possible moment. Accordingly, no excess or unnecessary privileges may be accorded. In some embodiments, secrets provider 320 may cause another entity to provide secret 332 to service 330. For example, this may include sending a request to another secret provision entity, such as privilege management server 130, to provide secret 332 to service 330.

In some embodiments, the action expected to be performed by service 330 may not necessarily be the same action directly triggered by trigger information 312. For example, trigger information 312 may trigger a first action performed by service 330, which may eventually cause a second action requiring secret 332. Accordingly, trigger information 312 may cause a cascade of multiple actions eventually requiring secret 332. Nonetheless, trigger information 312 may be used to predict the second action ultimately requiring secret 332, as described above.

Consistent with the disclosed embodiments, correlation information 322 may further include timing information that may indicate an expected timing at which service 330 may be expected to perform an action requiring secret 332. For example, correlation information 322 may include information accounting for the various intermediate actions required by service 330 (or other services) to indicate when secret 332 will be needed. Accordingly, secrets provider 320 may provide secret 332 at a time when secret 332 is expected to be needed, or shortly beforehand. In some embodiments, correlation information 322 may not necessarily identify the specific actions to be performed by service 330 and/or their expected durations. Accordingly, correlation information 322 may include timing information represented as a duration relative to when trigger information 312 is received, or various other reference events. In some embodiments, trigger information 312 may include timing information indicating when secret 332 will be required (e.g., cron job information, etc.). Alternatively or additionally, secret 332 may be provided immediately, after a preset time, or at various other timings. In embodiments where multiple secrets are provided to service 330, each secret may be provided at different timings according to the timing information.

Further, in some embodiments, the service requiring the secret may not necessarily be the same service that receives trigger information 312. As described above, service 330 may be configured to coordinate with various other services, such as service 340, as shown in FIG. 3. In some embodiments, trigger information 312 may cause service 330 to perform one or more actions in coordination with service 340. However, it may be service 340 that requires a secret 342 instead of service 330. Accordingly, while trigger information 312 may be transmitted to service 330, correlation information 322 may include information correlating trigger information 312 to secret 342, which may be required by service 340. Secrets provider 320 may thus provide secret 342 to service 340 using the various techniques above.

Similarly, trigger information 312 may cause a series of actions to be performed by multiple services, and multiple secrets may be provided to multiple services. In some embodiments, each of the secrets may be different. For example, secret 332 may be different than secret 342. Alternatively or additionally, the same secret may be provided to multiple services. In some embodiments, each secret may be provided to a service at a different time. For example, correlation information 322 may include timing information indicating the expected timings at which multiple secrets may be required and secrets provider 320 may cause the secrets to be provided to respective services at different timings according to the timing information. Accordingly, services 330 and 340 may work together to perform various actions using their own secrets 332 and 342.

After receiving secret 332, service 330 may be configured to perform the privileged action or the series of actions as described above, using secret 332. Secrets provider 320 may continue to monitor for and/or receive various trigger information and proactively provide secrets to services 330 and 340.

Because secrets provider 320 is configured to predict which secrets will be required by which services and when, in some instances, secrets provider 320 may make incorrect predictions. For example, this may include failing to identify secret 332 (or failing to identify secret 332 with a high enough confidence level), identifying an incorrect secret and providing it to service 330, providing secret 332 at an incorrect timing (e.g., before or after secret 332 is needed), or the like. Accordingly, secrets provider 320 may perform one or more alternate or remedial actions in such cases.

For example, in some embodiments, secrets provider 320 may receive a request from service 330 for secret 332. This may occur, for example, if secrets provider 320 has not provided secret 332 and/or provided a different secret. Accordingly, service 330 may be configured to send a request for secret 332 if it is not received proactively by secrets provider 320. In some embodiments, this may occur if secret 332 is not received by the time it is needed to perform an action, after a predetermined time after trigger information 312 is received, after a predetermined time after service 330 is ready to perform the action requiring secret 332, or the like. Based on the request, secrets provider 320 may be configured to provide secret 332. Alternatively or additionally, secrets provider 320 may monitor service 330 to determine whether the requirement for a secret has been satisfied. For example, if service 330 reaches a point where a secret would be required and doesn't proceed, this may indicate service 330 does not have the required secret.

In some embodiments, secrets provider 320 may not be able to identify secret 332. For example, correlation information 322 may not include enough information to correlate trigger information 312 to any particular secret and thus secrets provider 320 may not identify secret 332. In some embodiments, secrets provider 320 may provide secrets based on a threshold confidence level. For example, as described above, secrets provider 320 may be configured to determine confidence levels associated with various secrets. In some embodiments, these confidence levels may be compared to a threshold confidence level and secrets not meeting the requisite confidence level may not be provided. Accordingly, if a secret cannot be identified with a high enough confidence, no secret may be provided. As described above, service 330 may thus be configured to request secret 332 and secrets provider 320 may be configured to cause secret 332 to be provided based on the request.

According to some embodiments, secrets provider 320 may be configured to perform one or more actions in response to service 330 having to request secret 332. For example, secrets provider 320 may update correlation information 322 to indicate or reinforce a correlation between trigger information 312 (or parameters thereof) and secret 332. Accordingly, when trigger information 312 (or similar trigger information) is received in the future, secrets provider 320 may be able to identify secret 332 (or identify secret 332 with a higher confidence).

Figure 4A:
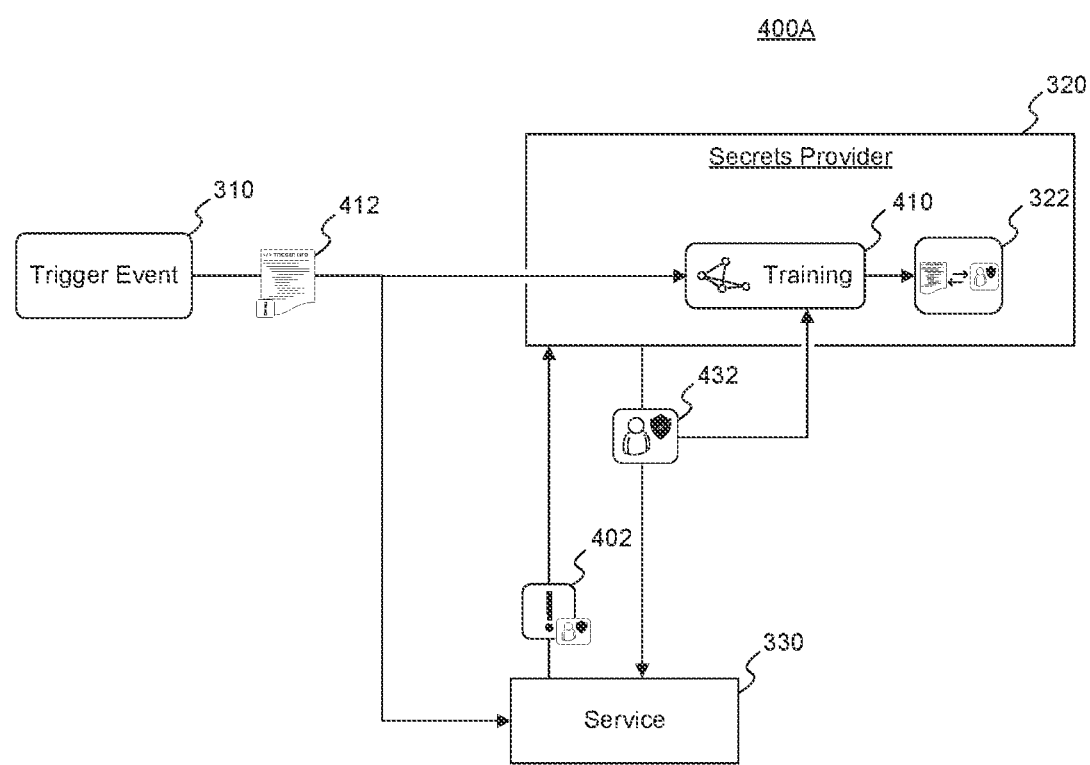
FIG. 4A is a block diagram illustrating an example training process for developing correlation information, consistent with the disclosed embodiments.
Figure 4B:
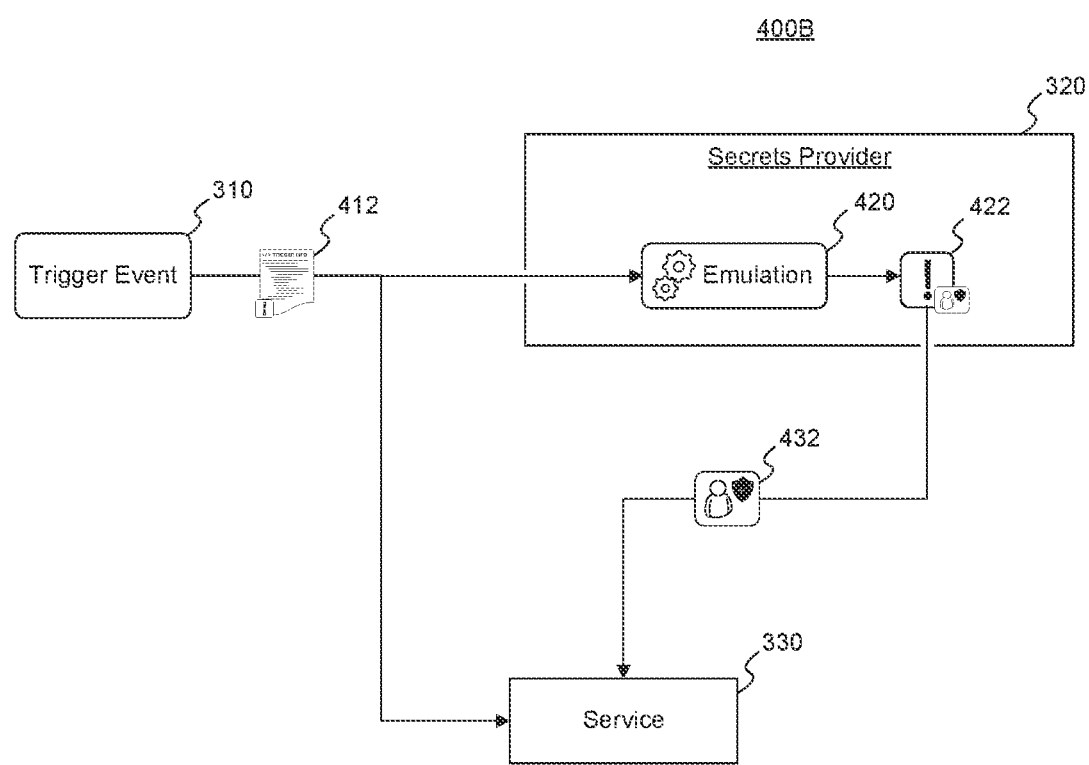
FIG. 4B is a block diagram illustrating an example emulation process for identifying a secret, consistent with the disclosed embodiments.
Figure 4C:
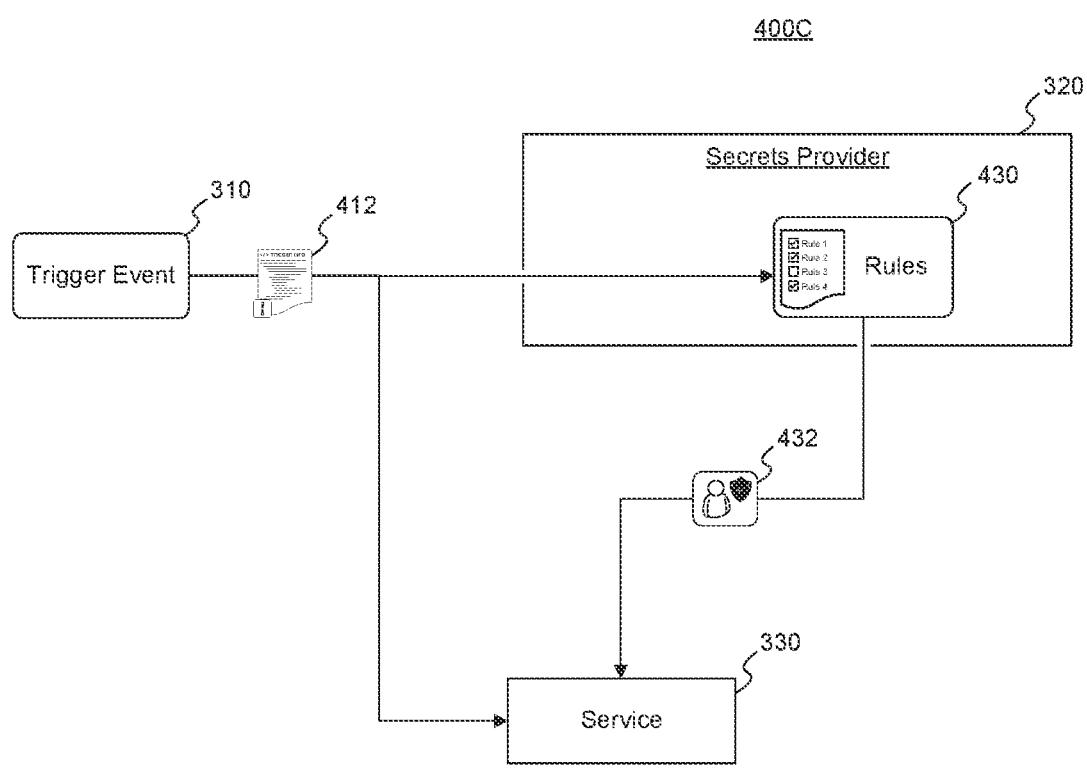
FIG. 4C is a block diagram illustrating an example process in which a secret is provided based on a plurality of rules, consistent with the disclosed embodiments.

As described above correlation information 322 may take various forms and may be implemented in various ways. In some embodiments, secrets provider 320 may be provided with correlation information 322 and may use it to predict secret 332. Alternatively or additionally, correlation information 322 may be generated by secrets provider 320, for example, through a learning process. Depending on the particular implementation, secret 332 may be identified using correlation information 322 in various ways. For example, identifying secret 332 may include applying a trained model, emulating at least one aspect of an application associated with secret 332, or applying at least one rule of a set or group of rules. FIGS. 4A-4C and the associated descriptions provide various examples of how correlation information 322 may be implemented and/or developed.

In some embodiments, correlation information 322 may be developed using a learning or training process, as indicated above. FIG. 4A is a block diagram illustrating an example training process 400A for developing correlation information 322, consistent with the disclosed embodiments. In this example, secrets provider 320 may receive trigger information 412, which may be the same as or similar to trigger information 312 as described above. For example, trigger information 412 may cause service 330 to perform one or more actions, as described above. Service 330 may perform at least one action requiring a secret 432. In this case, correlation information 322 may not yet include information sufficient to identify secret 432. Accordingly, service 330 may send a request 402 for secret 432 to secrets provider 320, as shown. Secrets provider 320 may be configured to provide secret 432 based on request 402 using conventional techniques.

Consistent with the disclosed embodiments, secrets provider 320 may further be configured to perform a training process 410 to generate correlation information 322 based on trigger information 412 and secret 432 (and/or request 402). For example, this may include learning that secret 432 is required by service 330 based on trigger information 412. In some embodiments, training process 410 may include recording an association between trigger information 412 (or one or more parameters thereof) and secret 432. For example, this may include recording the correlation in a database or other form of data structure. In some embodiments, this may further include recording timing information, as described above. As additional trigger information is received, secrets provider 320 may develop a database of correlations between trigger information 312 and associated timings.

Alternatively or additionally, training process 410 may include training a machine learning model to predict secrets required by service 330 and/or other services. For example, after identifying secret 432 based on request 402, secrets provider 320 may input trigger information 412 and secret 432 into a training algorithm configured to learn associations between various parameter of trigger information and associated secrets. As a result, a trained model may be generated, which may be configured to receive one or more parameters of trigger information as an input and generate a prediction for a secret that is expected to be required. Accordingly, correlation information 322 may include a trained model. In some embodiments, the trained model may be an artificial neural network configured to predict required secrets. Various other machine learning algorithms may be used, including a logistic regression, a linear regression, a regression, a random forest, a K-Nearest Neighbor (KNN) model, a K-Means model, a decision tree, a cox proportional hazards regression model, a Naïve Bayes model, a Support Vector Machines (SVM) model, a gradient boosting algorithm, a deep learning model, or any other form of machine learning model or algorithm.

In some embodiments, training process 410 may be performed during a separate training phase. For example, secrets provider 320 may operate in a training phase in which it provides secrets to various services based on specific requests. During this time, secrets provider 320 may learn from the requests and associated trigger information to develop correlation information 322. Alternatively or additionally, training process 410 may be implemented during process 300 as descried above. For example, as described above, service 330 may generate requests for secrets only if they are not received and secrets provider 320 may be configured to continually learn from these requests (e.g., by updating weights of a trained model, or the like). In some embodiments, a trained model may be developed independently from secrets provider 320. For example, a training data set may be collected from various secrets providers and services, which may include training trigger information and training secret request information. This training data may be input into a training algorithm to generate a trained model, as described above, and the resulting model may be provided to secrets provider 320 (e.g., as correlation information 322).

In some embodiments, correlation information 322 may include data for emulating at least a portion or branch of an application. For example, service 330 may be part of an application, as described above. When the application is deployed, secrets provider 320 may receive at least a portion of the code and architecture of the application. Based on this code and architecture, secrets provider 320 may build an emulator of the app, which may specifically emulate parts of the application that require access to secrets. Whenever secrets provider 320 receives trigger information, it may emulate the behavior of all the services associated with the application and may predict which secrets are required by which services.

FIG. 4B is a block diagram illustrating an example emulation process 400B for identifying a secret, consistent with disclosed embodiments. As with the example in FIG. 4A, secrets provider 320 may receive trigger information 412, which may also be received at service 330 and may cause service 330 to perform one or more actions. In this example, secrets provider 320 may include emulation data for performing an emulation 420 of one or more actions of an application associated with service 330. For example, this may include inputting trigger information 412 into an emulated instance of the application and identifying which services are triggered to perform which actions (and which of those actions require secrets). In some embodiments, emulation 420 may be an emulation of a full application associated with service 330. Alternatively or additionally, secrets provider 320 may be configured to emulate a portion of the application. For example, this may include a portion associated with particular services, a portion associated with secured actions, or the like.

As a result of emulation 420, secrets provider 320 may identify a requirement 422 for secret 432. Secrets provider 320 may thus identify secret 432 and provide it to service 330 based on a result of emulation 420. As with training process 400A, emulation process 400B may be performed during an initial training phase. For example, secrets provider 320 may receive various trigger information (such as trigger information 412) and may perform emulation to identify secret 432. Based on emulation 420, secrets provider 320 may store data indicating the correlation as correlation information 322. Accordingly, the next time trigger information 412 (or similar trigger information) is received, secrets provider 320 may identify secret 432 without necessarily performing a subsequent emulation. In this example, correlation information 322 may be generated using emulation 420.

Alternatively or additionally, secrets provider 320 may continue to run emulations. For example, each time trigger information 412 is received at secrets provider 320, secrets provider 320 may run emulation 420 to identify secret 432. The same may be true for other trigger information. For example, based on trigger information 312, emulation 420 may identify a need for secret 332 by service 330 and a need for secret 342 by service 340. Based on the emulation, secrets provider 320 may cause secrets 332 and 342 to be provided, as described above. Accordingly, in this example, correlation information 322 may correspond to emulation 420 (or the data used to perform emulation 420). In some embodiments, emulation 420 may be performed at least as quickly as an actual application performs the corresponding tasks. Secret 432 may therefore be identified at the same time or before it is needed at service 330. In some embodiments, by emulating the application, timing information associated with each secret may also be determined.

According to some embodiments, secrets provider 320 may use a plurality of rules to identify secrets needed by one or more services. FIG. 4C is a block diagram illustrating an example process 400C in which a secret is provided based on a plurality of rules 430, consistent with the disclosed embodiments. As with the previous examples, secrets provider 320 may receive trigger information 412, which may also be received at service 330 and may cause service 330 to perform one or more actions. At least one of the actions may require a secret 432. In this example, secrets provider 320 may access a plurality of rules 430. Rules 430 may be generated in various ways. In some embodiments, when deploying the application associated with service 330, the developer may hardcode rules 430 indicating which secrets should be provided based on which trigger information. For example, this may include a rule specifying that when trigger information 412 is received, secret 432 is to be provided to service 330. In some embodiments, rules may be defined based on various parameters of trigger information 412. For example, a rule may be defined such that when a header of an HTTP request includes a certain value, secret 432 is to be provided. In some embodiments, rules 430 may be defined based on various conditions, which may provide for different rules depending on a wide variety of variables. For example, different rules may be triggered based on an identity associated with trigger information 412 (e.g., identity 112), a privilege level of the identity, a time of day of a request, a type of request, a security status of system 100, computing device 110, etc., or various other information that may affect which secrets are to be provided to which services.

One skilled in the art would recognize various potential use cases of the disclosed embodiments. In one potential use case, the disclosed embodiments may be implemented as an HTTP proxy for processing an HTTP request. For example, an HTTP proxy server may receive a request and forward it to a relevant application and/or service, such as a hypertext processor (PHP), Node, or the like. In this example, the request may be an HTTP GET request for/users. Accordingly, in response to the request, the service may return a list of users matching one or more specified criteria. In this case the HTTP request may correspond to trigger information 312 and the service may correspond to service 330.

When handling the request, the service may need to query a database, such as a Mongo database, a MySQL database, or the like. The database may be secured and may require a secret for accessing the database. Using conventional techniques, the server may send a request to a secrets provider in order to authenticate to the database. The secrets provider may provide the secret to the service in response to the request, and the service may query the database using the secret.

In contrast, using the disclosed techniques, the HTTP proxy may also forward the trigger information (in this example, the HTTP request) to secrets provider 320, which may start to predict which secrets will be required. In this case, secrets provider 320 will predict that service 330 will need read-only access to a table including the list of users. Secrets provider 320 may cause the secret to be provided without waiting for a request from service 330. Service 330 may receive secret 332 and proceed to query the database. This use case illustrates many of the advantages of the disclosed techniques. Because secrets provider 320 can predict the scope of secret 332 required by service 330, it may provide specific context-based permissions to service 330, thus reducing the likelihood secret 332 may be misappropriated or misused. Further, secret 332 can be provided without waiting for a request from the service, thereby improving the efficiency of the process. Further, because secret 332 is provided in response to trigger information 312, if an attacker takes control of service 330, it would not be able to perform activities that service 330 may otherwise have privileges to perform, depending on the trigger information. The described techniques thus also minimize the potential attack surface.

It is to be understood that the use cases described above are provided by way of example and are not intended to be limiting of the present disclosure in any way. One skilled in the art would recognize various other potential use cases that may provide similar benefits.

Figure 5:
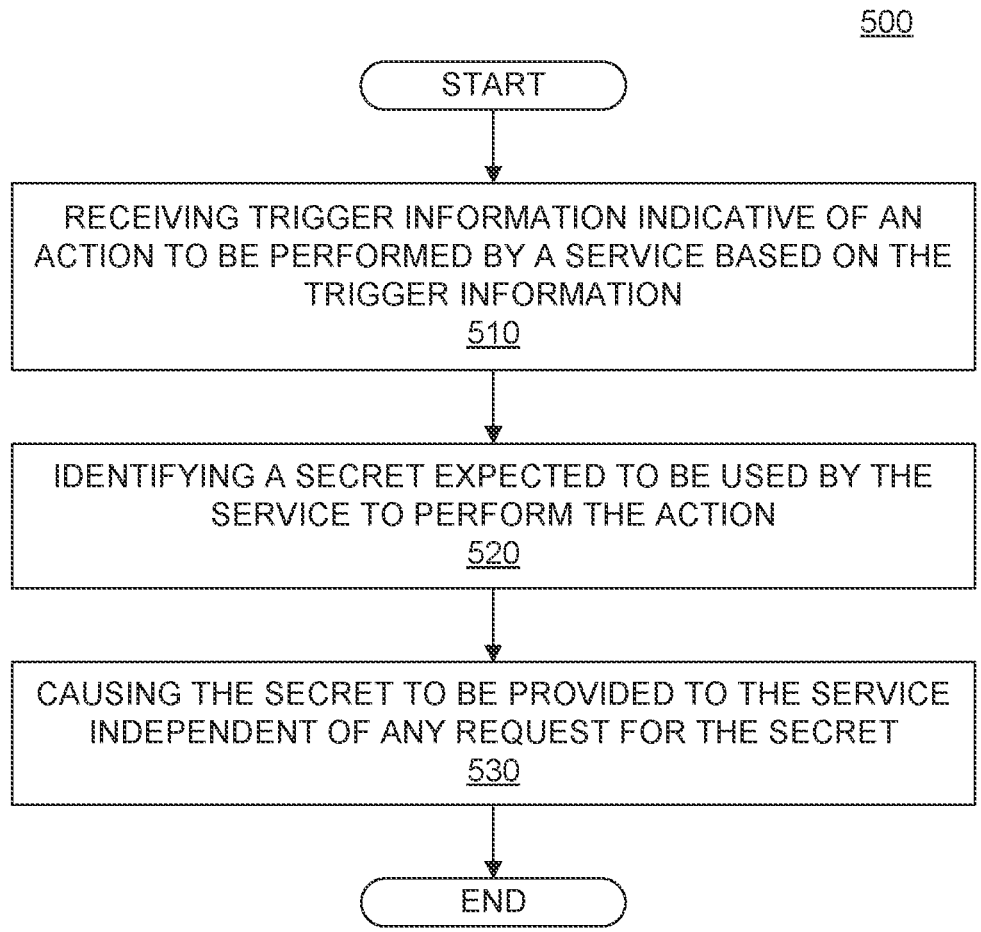
FIG. 5 is a flowchart showing an example process for securely providing secrets, consistent with the disclosed embodiments.

FIG. 5 is a flowchart showing an example process 500 for securely providing secrets, consistent with the disclosed embodiments. Process 500 may be performed by at least one processor of a computing device, such as processor 210, as described above. Alternatively or additionally, some or all of process 500 may be performed by at least one processor of a server, such as process 230. It is to be understood that throughout the present disclosure, the term "processor" is used as a shorthand for "at least one processor." In other words, a processor may include one or more structures that perform logic operations whether such structures are collocated, connected, or dispersed. In some embodiments, a non-transitory computer readable medium may contain instructions that when executed by a processor cause the processor to perform process 500. Further, process 500 is not necessarily limited to the steps shown in FIG. 5, and any steps or processes of the various embodiments described throughout the present disclosure may also be included in process 500, including those described above with respect to, for example, FIGS. 3, 4A, 4B, and 4C.

In step 510, process 500 may include receiving trigger information from an entity. For example, this may include receiving trigger information 312, as described above. The trigger information may be indicative of an action to be performed by at least one service based on the trigger information. For example, the trigger information may be indicative of an action to be performed by service 330 or service 340. In some embodiments, the trigger information may also be received by the at least one service. In other words, the same service may receive the trigger information and perform the action based on the trigger information. Alternatively or additionally, the trigger information may be received by a different service, which may, in turn, cause the at least one service to perform the action. Accordingly, the trigger information may indirectly cause the at least one service to perform the action. In some embodiments, the entity may be external to the at least one service. For example, the trigger information may be a request, such as an HTTP request, received from a source external to an application associated with the at least one service. Alternatively or additionally, the entity may be internal to the at least one service (or the application). For example, the trigger information may include a lambda call, a cron job, or other trigger occurring within an application.

In step 520, process 500 may include identifying at least one secret expected to be used by the at least one service to perform the action. For example, this may include identifying secret 332, as described above. The at least one secret may be identified based on information correlating the trigger information to the at least one secret, such as correlation information 322. As described above, the at least one secret may be identified in various ways. In some embodiments, identifying the at least one secret may include applying a trained model. For example, a model may be trained and implemented through process 400A, as described above. Accordingly, in some embodiments, the trained model may be a machine learning model. As another example, identifying the at least one secret may include emulating at least one aspect of an application associated with the at least one service based on the trigger information. For example, emulation 420 may be run to identify secret 332, as described above. As a further example, identifying the at least one secret may include applying at least one rule of a plurality of rules, such as rules 430. Accordingly, the information correlating the trigger information to the at least one secret may include at least one rule of a plurality of rules, the at least one rule associating the trigger information with the at least one secret.

The secret may be identified in various ways. In some embodiments, identifying the at least one secret expected to be used by the at least one service to perform the action may include predicting, based on the trigger information, the action to be performed by at least one service. Accordingly, the information correlating the trigger information to the at least one secret may include information correlating the action to the at least one secret, information correlating the trigger information to the action, or both. In some embodiments, the trigger information may be associated with at least one parameter to be used to perform the action, as described above. The at least one secret may be identified using the at least one parameter.

In some embodiments, the secrets provider may cause multiple secrets to be provided to multiple services. Accordingly, step 520 may further include identifying at least one additional service associated with the action; identifying at least one additional secret expected to be used by the at least one additional service; and causing the at least one additional secret to be provided to the at least one additional service. Similar to the at least one secret, the at least one additional secret may be provided to the at least one additional service independent of, or without, a request for the at least one additional secret.

According to some embodiments, the correlation information may be generated by a secrets provider. Accordingly, process 500 may include generating the information correlating the trigger information to the at least one secret. In some embodiments, the correlation information may be generated through a learning or training process. For example, process 500 may include receiving, from the entity, initial trigger information indicative of the action to be performed by at least one service; identifying a request from the at least one service for the at least one secret; determining a correlation between the initial trigger information and the at least one secret; and generating the information correlating the trigger information to the at least one secret based on the determined correlation. In some embodiments, the initial trigger information and the trigger information may share at least one common parameter. Alternatively or additionally, the initial trigger information and the trigger information may not share a common parameter. As described above, generating the information correlating the trigger information to the at least one secret may include storing the determined correlation.

According to some embodiments, the at least one secret may be identified through emulation of at least one portion of the application. Accordingly, process 500 may include accessing data for emulating actions performed by the at least one service; initiating an emulation of the at least one service based on the trigger information; determining the at least one secret is used based on the emulation; and generating the information correlating the trigger information to the at least one secret based on the determination. In some embodiments, generating the information correlating the trigger information to the at least one secret may further include: accessing at least a portion of code used by the at least one service; and generating the data for emulating actions performed by the at least one service based on the at least a portion of code.

In step 530, process 500 may include causing the at least one secret to be provided to the at least one service. As described herein, the at least one secret may be provided to the at least one service independent of any request for the at least one secret. The secret may be provided to the at least one service in various ways. In some embodiments, causing the at least one secret to be provided to the at least one service may include generating or retrieving the at least one secret and transmitting the at least one secret to the at least one service. Alternatively or additionally, causing the at least one secret to be provided to the at least one service may include generating instructions for the at least one secret to be provided to the at least one service. Consistent with the disclosed embodiments, the at least one service may be configured to initiate performing the action prior to receiving the at least one secret.

According to some embodiments, the at least one secret may provide specific context-based permissions based on the trigger information. Accordingly, the at least one secret may not be used by the at least one service to perform at least one additional action not associated with the trigger information.

In some instances, the at least one service may require a different secret than the one provided. For example, process 500 may further include receiving, from the at least one service, an indication that at least one alternate secret is required. Accordingly, at least in some embodiments, process 500 may further include causing the at least one alternate secret to be provided to the at least one service. Process 500 may further include updating the information correlating the trigger information to the at least one secret to reflect a correlation between the trigger information and the at least one alternate secret, as described above.

In some embodiments, process 500 may include foregoing causing the at least one secret to be provided to the at least one service based on a determination that the at least one secret expected to be used cannot be identified. Process 500 may further include receiving, from the at least one service, an indication that at least one alternate secret is required; and causing the at least one alternate secret to be provided to the at least one service based on the indication. In some embodiments, the determination that the at least one secret expected to be used cannot be identified may based on a level of confidence, as described above. In some embodiments, process 500 may further include updating the information correlating the trigger information to the at least one secret based on the indication. According to some embodiments a secrets provider may monitor one or more services after providing a secret (or foregoing providing a secret). For example, process 500 may include monitoring the at least one service to determine a requirement for the at least one secret has not been satisfied. Process 500 may further include causing at least one of the at least one secret or at least one alternate secret to be provided to the at least one service based on the monitoring.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials, and code types will be developed, and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory computer readable medium including instructions that, when executed by at least one processor, cause the at least one processor to perform operations for providing secrets independent of a request, the operations comprising:
   receiving, from an entity, trigger information indicative of an action to be performed by at least one service, wherein the trigger information comprises information provided by the entity to the at least one service to cause the at least one service to perform the action;
   analyzing the trigger information to identify at least one secret required by the at least one service to perform the action, wherein analyzing the trigger information includes:
      accessing information correlating the trigger information to the at least one secret, and
      identifying the at least one secret based on the information correlating the trigger information to the at least one secret; and
   causing the at least one secret to be provided to the at least one service, wherein the at least one secret is provided to the at least one service without receiving a request for the at least one secret by the at least one service.

2. The non-transitory computer readable medium of claim 1, wherein identifying the at least one secret includes at least one of: applying a trained model, emulating at least one aspect of an application associated with the at least one service based on the trigger information, or applying at least one rule of a plurality of rules.

3. The non-transitory computer readable medium of claim 1, wherein identifying the at least one secret includes applying a trained model and wherein the trained model is a machine learning model.

4. The non-transitory computer readable medium of claim 1, wherein the trigger information is associated with at least one parameter to be used to perform the action, and wherein the at least one secret is identified using the at least one parameter.

5. The non-transitory computer readable medium of claim 1, wherein identifying the at least one secret includes identifying the action to be performed by the at least one service based on the trigger information.

6. The non-transitory computer readable medium of claim 5, wherein the information correlating the trigger information to the at least one secret includes information correlating the action to the at least one secret.

7. The non-transitory computer readable medium of claim 5, wherein the information correlating the trigger information to the at least one secret includes information correlating the trigger information to the action.

8. The non-transitory computer readable medium of claim 1, wherein causing the at least one secret to be provided to the at least one service includes:
   at least one of generating or retrieving the at least one secret; and
   transmitting the at least one secret to the at least one service.

9. The non-transitory computer readable medium of claim 1, wherein causing the at least one secret to be provided to the at least one service includes generating instructions for the at least one secret to be provided to the at least one service.

10. The non-transitory computer readable medium of claim 1, wherein the operations further comprise:
    identifying, based on the trigger information, at least one additional service associated with the action;
    identifying, based on the trigger information, at least one additional secret required by the at least one additional service; and
    causing the at least one additional secret to be provided to the at least one additional service, wherein the at least one additional secret is provided to the at least one additional service without receiving a request for the at least one additional secret by the at least one additional service.

11. The non-transitory computer readable medium of claim 1, wherein the operations further comprise:
    receiving, from the at least one service, an indication that at least one alternate secret is required; and
    causing the at least one alternate secret to be provided to the at least one service.

12. The non-transitory computer readable medium of claim 11, wherein the operations further comprise updating the information correlating the trigger information to the at least one secret to reflect a correlation between the trigger information and the at least one alternate secret.

13. The non-transitory computer readable medium of claim 1, wherein the operations further comprise:
    foregoing causing the at least one secret to be provided to the at least one service based on a determination that the at least one secret required cannot be identified;
    receiving, from the at least one service, an indication that at least one alternate secret is required; and
    causing the at least one alternate secret to be provided to the at least one service based on the indication.

14. The non-transitory computer readable medium of claim 13, wherein the determination that the at least one secret cannot be identified is based on a level of confidence.

15. The non-transitory computer readable medium of claim 13, wherein the operations further comprise updating the information correlating the trigger information to the at least one secret based on the indication.

16. The non-transitory computer readable medium of claim 1, wherein the operations further comprise:
    monitoring the at least one service to determine a requirement for the at least one secret has not been satisfied; and
    causing at least one of the at least one secret or at least one alternate secret to be provided to the at least one service based on the monitoring.

17. The non-transitory computer readable medium of claim 1, wherein the at least one secret cannot be used by the at least one service to perform at least one additional action not associated with the trigger information.

18. The non-transitory computer readable medium of claim 1, wherein the entity is external to the at least one service.

19. The non-transitory computer readable medium of claim 1, wherein the entity is a process executing as part of the at least one service.

20. The non-transitory computer readable medium of claim 1, wherein the at least one service is configured to initiate performing the action prior to receiving the at least one secret.

21. The non-transitory computer readable medium of claim 1, wherein the action includes accessing a target resource and wherein the at least one service is required to assert the at least one secret to the target resource to perform the action.

22. A computer-implemented method for providing secrets independent of a request, the method comprising:
   receiving, from an entity, trigger information indicative of an action to be performed by at least one service, wherein the trigger information comprises information provided by the entity to the at least one service to cause the at least one service to perform the action;
   analyzing the trigger information to identify at least one secret required by the at least one service to perform the action, wherein analyzing the trigger information includes:
      accessing information correlating the trigger information to the at least one secret and
      identifying the at least one secret based on the information correlating the trigger information to the at least one secret; and
   causing the at least one secret to be provided to the at least one service, wherein the at least one secret is provided to the at least one service without receiving a request for the at least one secret by the at least one service.

23. The computer-implemented method of claim 22, the method further comprising generating the information correlating the trigger information to the at least one secret.

24. The computer-implemented method of claim 23, wherein
   generating the information correlating the trigger information to the at least one secret includes:
      receiving, from the entity, initial trigger information indicative of the action to be performed by at least one service, the initial trigger information being distinct from the trigger information;
      identifying, a request from the at least one service for the at least one secret;
      determining a correlation between the initial trigger information and the at least one secret; and
      generating the information correlating the trigger information to the at least one secret based on the determined correlation.

25. The computer-implemented method of claim 24, wherein the method further includes storing the determined correlation.

26. The computer-implemented method of claim 24, wherein the initial trigger information and the trigger information share at least one common parameter.

27. The computer-implemented method of claim 24, wherein the initial trigger information and the trigger information do not share a common parameter.

28. The computer-implemented method of claim 23, wherein generating the information correlating the trigger information to the at least one secret includes:
   accessing data for emulating actions performed by the at least one service;
   initiating an emulation of the at least one service based on the trigger information;
   determining the at least one secret is used based on the emulation; and
   generating the information correlating the trigger information to the at least one secret based on the determination.

29. The computer-implemented method of claim 28, wherein generating the information correlating the trigger information to the at least one secret further includes:
   accessing at least a portion of code used by the at least one service; and
   generating the data for emulating actions performed by the at least one service based on the at least a portion of code.

30. The computer-implemented method of claim 22, wherein the information correlating the trigger information to the at least one secret includes at least one rule of a plurality of rules, the at least one rule associating the trigger information with the at least one secret.

* * * * *